(12) United States Patent
Sano

(10) Patent No.: US 7,091,474 B2
(45) Date of Patent: Aug. 15, 2006

(54) ROTATION ANGLE DETECTING DEVICE

(75) Inventor: Tadashi Sano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/174,380

(22) Filed: Jul. 1, 2005

(65) Prior Publication Data

US 2006/0000969 A1 Jan. 5, 2006

(30) Foreign Application Priority Data

Jul. 5, 2004 (JP) ............................. 2004-198080

(51) Int. Cl.
*G01D 5/34* (2006.01)
(52) U.S. Cl. ........................ 250/231.13; 250/231.15; 250/231.17
(58) Field of Classification Search ........... 250/231.13, 250/231.15, 231.17
See application file for complete search history.

(56) References Cited

U.S. PATENT DOCUMENTS 6,130,425 A * 10/2000 Sano ................... 250/231.14
2001/0008270 A1* 7/2001 Ohgoshi et al. ....... 250/231.13

* cited by examiner

*Primary Examiner*—Georgia Epps
*Assistant Examiner*—Brian J. Livedalen
(74) *Attorney, Agent, or Firm*—Brinks Hofer Gilson & Lione

(57) ABSTRACT

A rotation angle detecting device includes a housing which is constituted by a combination of a case and a cover; a resistance board; a code wheel; a slider rotating plate; a slider; a circuit board; signal detecting elements; and a gear which transmits the rotation of the code wheel at a predetermined speed reduction ratio to the slider rotating plate, which are enclosed in the housing. Circular pin insertion holes are formed in positions where the code wheel, the case, and the cover face each other, respectively. A pin insertion hole having a circular-arc shape is formed in the slider rotating plate.

3 Claims, 3 Drawing Sheets

ROTATION ANGLE DETECTING DEVICE

This application claims the benefit of priority to Japanese Patent Application No. 2004-198080 filed on Jul. 5, 2004, herein incorporated by reference.

BACKGROUND OF THE INVENTION

1. Field of the Invention

The present invention relates to a rotation angle detecting device which is applied to a rudder angle sensor for a car, and more specifically to an adjusting unit for a neutral position (a position where an absolute angle is 0°) in a rotation angle detecting device including a digital incremental-type rotation detecting unit which detects a rotation angle within 360° to output a digital code signal and an analog absolute-type rotation detecting unit which detects the number of rotations more than one rotation to output an analog signal.

2. Description of the Related Art

Conventionally, a technique is known in which a rotation angle detecting device is provided between a steering shaft and a chassis of a car so that the damping force of a suspension, the shift position of an automatic transmission, and steering of a rear wheel in a four-wheel steering car are controlled based on the steering angle, steering speed, and steering direction of a steering wheel which are detected by the rotation angle detecting device. In order to perform such control, a rotation angle over 360° needs to be detected. Therefore, a rotation angle detecting device capable of detecting an absolute angle is used.

As the rotation angle detecting device capable of detecting an absolute angle, a device is conventionally known which is constituted by a combination of an incremental-type rotation detecting unit for detecting a rotation angle within 360° and an absolute-type rotation detecting unit for detecting the number of rotations more than one rotation and which transmits the rotation of a rotor member constituting the incremental-type rotation detecting unit to a rotation ring constituting the absolute-type rotation detecting unit through a gear mechanism having a predetermined speed reduction ratio (for example, see Japanese Unexamined Patent Application Publication No. 10-227631).

The rotation angle detecting device disclosed in Japanese Unexamined Patent Application Publication No. 10-227631 includes an incremental-type rotation detecting device and an absolute-type rotation detecting device which are all digital types. However, instead of the rotation angle detecting device having such a constitution, a device is also known which is constituted by a combination of a digital incremental-type rotation detecting unit and an analog absolute-type rotation detecting unit which are all digital types. As the analog absolute-type rotation detecting unit, a unit is used which is constituted by a resistance board having a resistance pattern and a slider which is slidably brought into contact with the resistance pattern.

In this type of rotation angle detecting device which is used for controlling a car, the neutral position of a steering shaft needs to exactly coincide with the position of the rotation angle detecting device where an absolute angle is 0°, when the rotation angle detecting device is incorporated into a car. Therefore, in order that the rotation angle detecting device is easily incorporated into a car, the position of a signal detecting section with respect to a rotating section, such as the rotor section or the rotation ring, is set to the position where an absolute angle is 0°, and the rotating section and the signal detecting section are required to be fixed to the position, when the rotation angle detecting device is shipped.

In order to fix the position of the signal detecting section with respect to the rotating section to the position where an absolute angle is 0°, the following method is used. Pin insertion holes having the same diameter are respectively formed in predetermined positions of a housing and the rotating section constituting the rotation angle detecting device, that is, in the positions where the signal detecting section and the rotating section face each other in a state where the position of the rotating section with respect to the signal detecting section is adjusted to the position where an absolute angle is 0°. After the rotation angle detecting device is assembled, a fixing pin passes through the respective pin insertion holes.

When a car is assembled, the rotation angle detecting device is assembled into a steering shaft or the like in a state where the fixing pin has passed through the respective pin insertion holes. After a car is assembled, the fixing pin is pulled out, so that the steering shaft can be rotated. Accordingly, the neutral position of the steering shaft when a car is assembled and the position of the rotation angle detecting device where an absolute angle is 0° do not need to be adjusted, which makes it easy to assemble a car.

In the meantime, in the rotation angle detecting device for a car including the analog absolute-type rotation detecting device, an output voltage value of the absolute-type rotation detecting device is required to be set in the strict range of 2.5±0.05 V, for example, in a state where an absolute angle is 0°.

However, the output voltage value of the analog absolute-type rotation detecting device is determined by the contact position of the slider with respect to the resistance pattern when the fixing pin passes through the respective pin insertion holes formed in the housing and the rotating section, and the voltage value is varied by a forming error of the resistance pattern and an assembling error of the resistance board into the housing. Therefore, it is hard to obtain an output voltage value in the above-described strict range, even though forming precision of the resistance pattern and assembling precision of the resistance board into the housing are designed to be enhanced. For this reason, in the related art, a method is adopted in which an output voltage value of an absolute-type rotation detecting device is examined after assembling, and then only an absolute-type rotation detecting device whose output voltage is determined to be proper is shipped.

As such, the conventional rotation angle detecting device is not provided with a unit for adjusting an output voltage value of an absolute-type rotation detecting section during assembling, so that only rotation angle detecting devices having a good quality are selectively shipped. Therefore, the manufacturing yield is lowered, and a rotation angle detecting device becomes expensive.

Moreover, if an output voltage adjusting unit, such as a variable resistor, is incorporated into a rotation angle detecting device, the manufacturing yield can be improved. However, the number of components increases, and an assembling operation becomes complicated, which makes it difficult to obtain an effect of a reduction in cost.

SUMMARY OF THE INVENTION

The invention has been finalized in view of the drawbacks inherent in the conventional rotation angle detecting device. An object of the invention is that it provides a rotation angle detecting device which is capable of adjusting an output voltage value of an absolute-type rotation detecting device during assembling and which has a lower manufacturing cost.

In order to achieve the above-mentioned object, according to an aspect of the invention, a rotation angle detecting device includes a housing that is formed by snap-connecting a cover to a case having an opening for allowing a rotating body to be rotatably supported; a resistance board that is fixed on an inner surface of the cover to have an opening into which the rotating body inserted; a slider rotating plate that has an opening into which the rotating body is inserted, that is disposed to be opposite to the resistance board, and that is rotatably supported by the cover; a first gear that is formed in the slider rotating plate; a slider that is fixed on the slider rotating plate and is slidably brought into contact with the resistance board; a code wheel that has a code pattern string thereon, that rotatably holds the slider rotating plate, and that is rotatably held in the cover and the case; a second gear formed in the code wheel; a circuit board that is fixed to the case; a plurality of signal detecting elements that are electrically connected to the circuit board to detect signals from the code pattern string; and a gear that is supported by the case, that has a third gear which is meshed with a first gear formed in the slider rotating plate and a fourth gear which is meshed with the second gear formed in the code wheel, and that decelerates the rotation of the code wheel to transmit it to the slider rotating plate. In the rotation angle detecting device, circular pin insertion holes through which a fixing pin passes so as to fix the code wheel in a position where an absolute angle is 0° are respectively formed in positions where the code wheel, the case, and the cover face each other. Further, in a position where the slider rotating plate and the pin insertion hole face each other, a pin insertion hole having a long-circular-arc shape in the circumferential direction of the slider rotating plate is formed to enable the slider rotating plate to be rotated within a predetermined angle range in a state where the fixing pin is inserted.

If the slider rotating plate is rotated in the circumferential direction, the relative position of the slider with respect to the resistance board changes, and an output voltage value of an analog absolute-type rotation detecting unit which is constituted by the resistance board and the slider changes. Therefore, after the circular pin insertion holes formed in the case and the cover are disposed so as to face the circular pin insertion hole formed in the code wheel, the output voltage value of the absolute-type rotation detecting unit, which is measured before the case and the cover are incorporated into each other, can be deviated from a predetermined value according to an absolute angle of 0°. In this case, by rotating the slider rotating plate in the longitudinal range of the pin insertion hole having a circular-arc shape, the output voltage value of the absolute-type rotation detecting unit coincides with a predetermined value, and then the case and the cover are incorporated with each other by snap-connection. After that, the fixing pin passes through the respective circular pin insertion holes and the arc-shaped pin insertion hole, so that the rotation angle detecting device can be fixed in a shipping state. Therefore, a rotation angle detecting device having a good quality can be easily manufactured with a high yield.

Further, in the rotation angle detecting device having the above-mentioned structure, it is preferable that, as the code pattern string, a slit string be formed in the code wheel, and that a photo-interrupter formed by a combination of a light-emitting element and a light-receiving element be used as the signal detecting element.

As such, if an incremental-type rotation detecting unit is constituted by the code wheel having the slit string formed therein and the photo-interrupter, signal detection can be performed in a non-contact state. In addition, there is no case where signal detection precision is degraded due to the degradation of reflectance caused by dust adhered to the code wheel, unlike a case in which a code pattern string is formed on a reflecting plate. Therefore, signal detection can be performed precisely and reliably.

Furthermore, in the rotation angle detecting device having the above-mentioned structure, it is preferable that the resistance board be provided with connection terminals that electrically connect the resistance board to the circuit board, and that the circuit board be provided with connector pins that electrically connects the circuit board to an external connector.

As such, if the connection pin through which the resistance board and the circuit board are electrically connected to each other is provided on the resistance board, the connection between the resistance board and the circuit board can be completed only by plugging the leading end of the connection pin into the circuit board when the rotation angle detecting device is assembled. Therefore, the rotation angle detection device can be assembled easily.

DESCRIPTION OF THE PREFERRED EMBODIMENT

Figure 1:
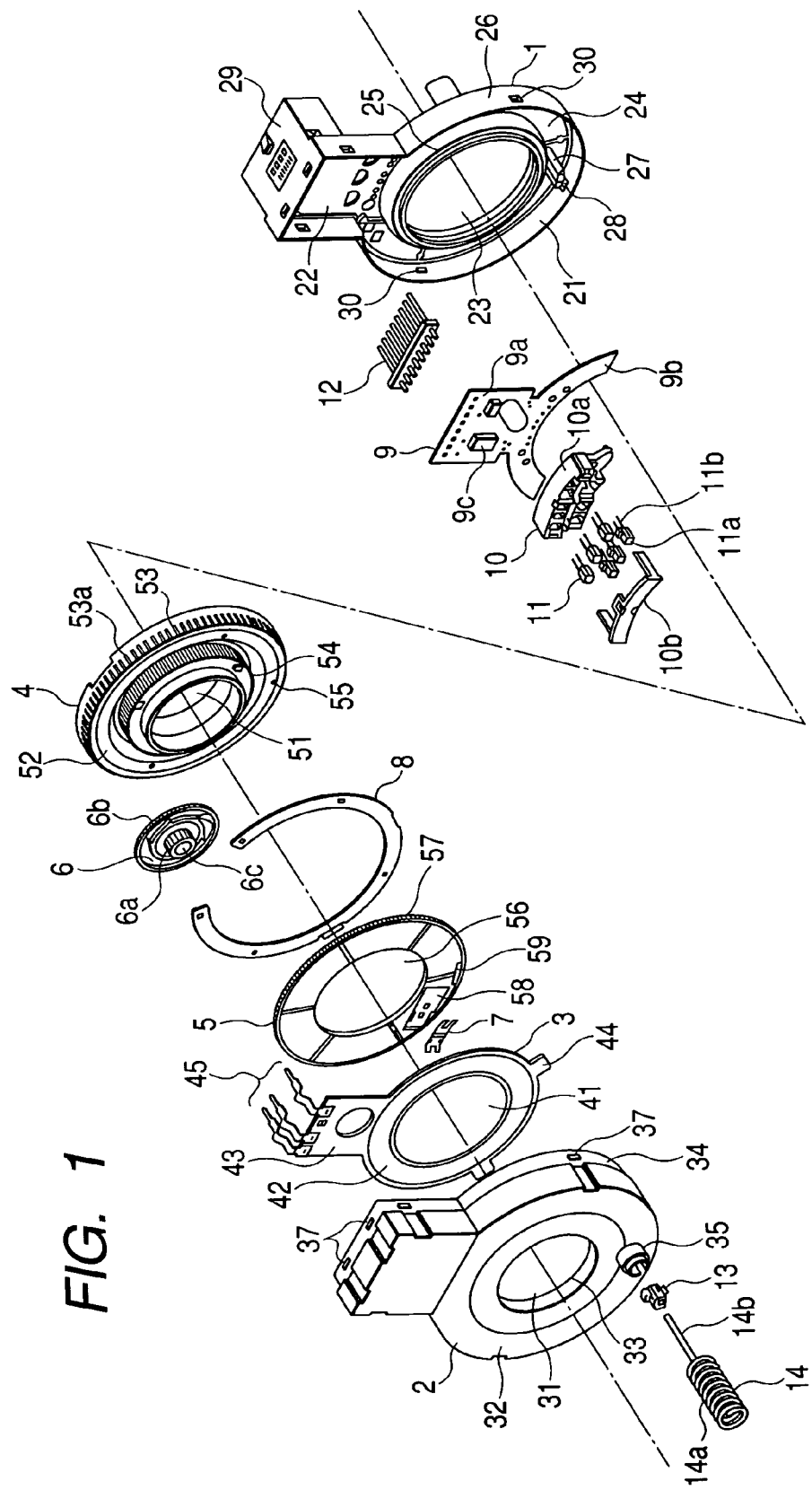
FIG. 1 is an exploded perspective view of a rotation angle detecting device according to an embodiment of the present invention.
Figure 2:
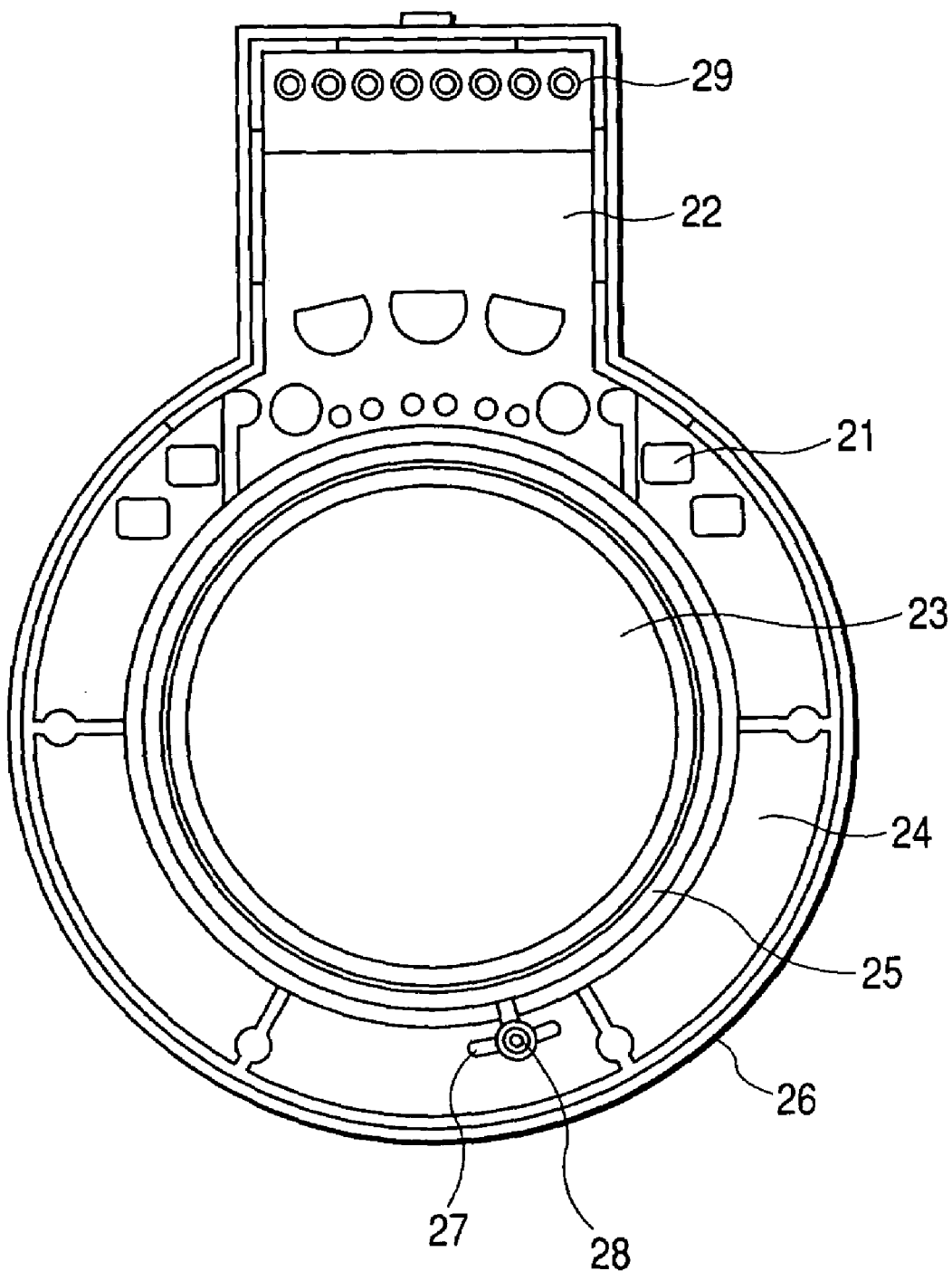
FIG. 2 is a plan view seen from the inner surface of a case according to an embodiment of the invention.
Figure 3:
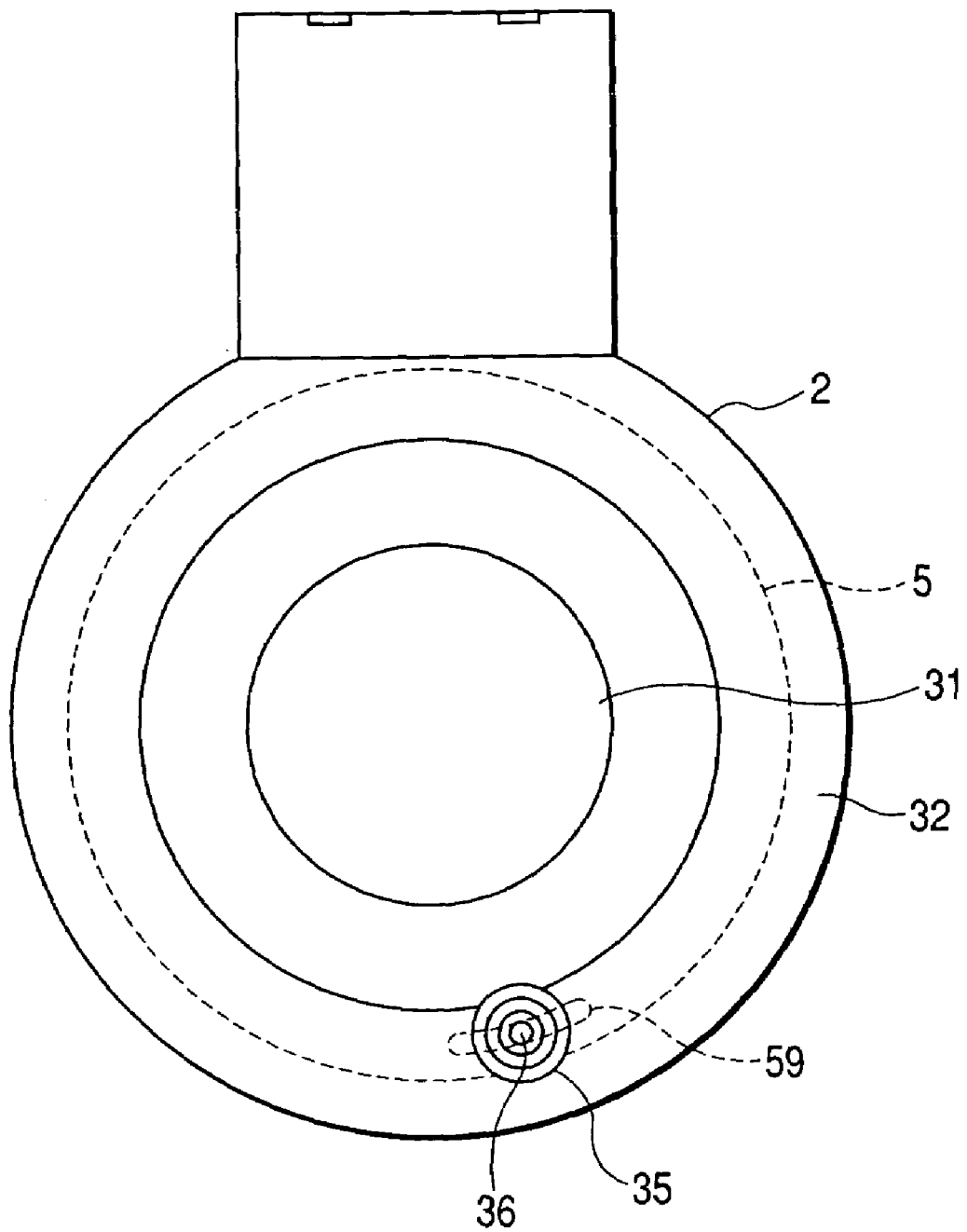
FIG. 3 is a plan view seen from the outer surface of a cover according to an embodiment of the invention.

Hereinafter, a rotation angle detecting device according to an embodiment of the invention will be described with reference to FIGS. 1 to 3. FIG. 1 is an exploded perspective view of a rotation angle detecting device according to an embodiment of the invention. FIG. 2 is a plan view of a case according to an embodiment of the invention, as viewed from an inner surface thereof, and FIG. 3 is a plan view of a cover according to an embodiment of the invention, as viewed from an outer surface thereof.

As shown in FIG. 1, the rotation angle detecting device according to the present embodiment mainly includes a case 1, a cover 2, a resistance board 3 which is fixed on the inner surface of the cover 2, a code wheel 4 and a slider rotating plate 5 which are rotatably provided inside a housing constituted by a combination of the case 1 and the cover 2, a gear 6 decelerating the rotation of the code wheel 4 to transmit the reduced rotating force to the slider rotating plate 5, a slider 7 which is fixed on the slider rotating plate 5, a rotating-plate holder 8 which holds the slider rotating plate 5 to rotate in the inner surface of the cover 2, a circuit board 9 which is fixed on the inner surface of the case 1, a signal detecting element receiver 10 which is mounted on the circuit board 9; a plurality (six in this embodiment) of signal detecting elements 11 which are arranged in a predetermined array inside the signal detecting element receiver 10 and whose terminals are electrically connected to the circuit board 9; a connector pin 12 for connecting an external connector whose one end is electrically connected to the circuit board 9; a pin holder 13 which is attached to the cover 2; and a fixing pin 14 whose leading end is inserted into the housing through the pin holder 13.

The case 1 has a circular ring section 21 and a rectangular section 22 projecting from a part of the ring section 21 in the diametric direction, and is formed in a container shape with a top plate 24 in which a central opening 23 is formed in the center of the ring section 21, a ring-shaped code wheel holding section 25 erected from an inner circumferential edge of the top plate 24, and an outer wall 26 erected from the outer circumferential edge of the top plate 24. A boss 27 projects from the inner surface of the ring section 21 and, a circular pin insertion hole 28 for inserting the fixing pin 14 is formed in the center of the boss 27, as shown in FIG. 2. In addition, on the leading end of the rectangular section 22, an external-connector connecting section 29 for inserting an external connector (not shown) is formed in the direction orthogonal to the top plate 24. Further, a plurality of locking holes 30 for snap-connecting the case 2 are formed on the outer wall 26.

The case 2 having the same outer appearance as the cover 1 is formed in a container shape with a top plate 32 having a central opening 31, a ring-shaped rotor holding section 33 erected from an inner circumferential edge of the top plate 32, and an outer wall 34 erected from the outer circumferential edge of the top plate 32. A housing section 35 for the pin holder 13 is formed in a predetermined position of the outer surface of the top plate 32, that is, in the opposed position to the pin insertion hole 28 formed in the case 1 when the case 1 and the cover 2 is incorporated. At the center of the housing section 35, a circular pin insertion hole 36 for inserting the fixing pin 14 is formed, as shown in FIG. 3. In addition, a plurality of locking claws 37 which are snap-connected to the locking holes 30 formed in the outer wall 26 of the case 1 project from the outer surface of the outer wall 34.

The case 1 and the cover 2 are incorporated by snap-connecting the locking claws 37 formed on the cover 2 to the locking holes 30 formed in the case 1 to be set in a stator section, such as a chassis of, for example, a car.

The resistance board 3 includes a ring-shaped section 42 having a central opening 41, a rectangular section 43 and a positioning projection 44 which project from a part of the ring-shaped section 42 in the diametric direction, and connection terminals 45 made of metal which are mounted on the rectangular section 43. A predetermined resistance pattern and a predetermined circuit pattern are formed on the surfaces of the ring-shaped section 42 and the rectangle section 43 facing the slider rotating plate 5, respectively, and the connection terminals 45 are electrically connected to the circuit pattern formed on the rectangular section 43. The resistance board 3 is fixed on the inner surface of the cover 2 by a double-sided adhesive tape (not shown). Positioning the cover 2 and the resistance board 3 is performed by fitting the positioning projection 44 formed on the resistance board 3 into an engaging concave section (not shown) formed in the inner surface of the cover 2.

The code wheel 4 includes a wheel section 52 having a central opening 51 forming an inner wall of a tubular holder which is fixed to a rotating body, such as a steering shaft, a pattern string 53 composed of an array of a plurality of signal detection through-holes 53a formed in an outer circumference of the wheel section 52, and a second gear 54 formed concentrically with the central opening 51. A circular pin insertion hole 55 for inserting the fixing pin 14 is formed in the outer circumference of the wheel section 52 farther from the center than a forming section of the second gear 54. In the position where the pin insertion hole 55 is formed in the code wheel 4, the position of the rotating direction of the code wheel 4 with respect to the signal detecting elements 11 is adjusted to a position where an absolute angle is 0°, when the fixing pin 14 passes through a series of the pin insertion holes 28, 36, and 55. The code wheel 4 is rotatably held in the code wheel holding section 25 formed in the case 1, and is fixed to a rotating body, such as a steering wheel, passing through the central opening 51 when used, thereby rotating together with the rotating body.

The slider rotating plate 5 is formed in a ring shape having a central opening 56 into which a rotating body is rotatably inserted. A first gear 57 is formed on the outer circumference of the slider rotating plate 5, and a slider mounting section 58 is formed on a surface thereof opposite to the resistance board 3. A pin insertion hole 59 having a long-circular-arc shape in the circumferential direction is formed substantially in the same position of the slider rotating plate 5 as those of the respective circular pin insertion holes 28, 36, and 55 in the rotation-axis direction. Further, in the mounting position of the slider 7 and the forming position of the pin insertion hole 59 in the slider rotating plate 5, the center or the neighborhood of the arc-shaped pin insertion hole 59 is set to coincide with the center of each of the circular pin insertion holes 28, 36, and 55, as shown in FIG. 3, when the slider 7 is set with respect to the resistance board 3 so that an output voltage value of an absolute-type rotation detecting section constituted by the resistance board 3 and the slider 7 is or approximates a predetermined value.

The gear 6 is a two-stage gear including a third gear 6a having a small diameter which is meshed with the first gear 57 formed around the outer circumference of the slider rotating plate 5 and a fourth gear 6b having a large diameter which is meshed with the second gear 54 formed in the wheel section 52 of the code wheel 4. The third gear 6a is formed concentrically with the fourth gear 6b. A center hole 6c is formed at the center of the third gear 6a. By inserting a gear holding shaft (not shown) projecting from the inner surface of the cover 2 into the center hole 6c, the gear 6 is rotatably held on the inner surface of the cover 2.

The number of teeth of each of the first gear 57 formed in the slider rotating plate 5, the second gear 54 formed in the code wheel 4, and the third and fourth gears 6a and 6b which are formed in the gear 6 is set so that the rotation of the code wheel 4 is transmitted at a predetermined speed reduction ratio to the slider rotating plate 5.

The slider 7 is made of a metallic material, such as phosphor bronze, having excellent elasticity and conductivity, and is fixed to the slider mounting section 58 of the slider rotating plate 5 by being caulked by heat.

The rotating plate holder 8 is formed of a horseshoe-shaped metallic plate whose outer diameter is larger than the outer diameter of the slider rotating plate 5 and whose inner diameter is smaller than the outer diameter of the slider rotating plate 5. After the resistance board 3 and the slider rotating plate 5 are incorporated on the inner surface of the cover 2, the rotating plate holder 8 is fixed on the inner surface of the cover 2 by being caulked by heat.

The circuit board 9 includes a rectangular section 9a which is housed inside the rectangular section 22 of the case 1 and an arc-shaped section 9b which is housed inside the ring section 21 of the case 1. On the surface of the circuit board 9, a predetermined circuit pattern is formed which includes terminals connected to the signal detecting elements 11 and terminals connected to the connector pin 12. In a predetermined position of the circuit board 9, a chip component 9c is mounted.

The signal detecting element receiver 10 includes a holder 10a having subsections in which the plurality of signal detecting elements 11 are individually housed in a predetermined array and a stopper 10b which is fitted to the openings of the holder 10a to prevent the signal detecting elements 11 from being detached from the holder 10a. The holder 10a is fixed on the circuit board 9.

As the signal detecting element 11, a photo-interrupter is used in which a light-emitting element 11a and a light-receiving element 11b are incorporated into one body opposite to each other. The terminals of the respective light-emitting elements 11a and the terminals of the respective light-receiving elements 11b are electrically connected to the circuit board 9. The light-emitting elements 11a and the light receiving elements 11b constituting the signal detecting elements 11 are disposed so as to face the inner surface and the outer surface of the code pattern string 53 formed in the code wheel 4.

The connector pin 12 is formed by incorporating a predetermined number of external-connector connecting pins with a resin mold in a predetermined array. One end thereof is electrically connected to the circuit board 9, and the other end is disposed inside the external-connector connecting section 29 formed in the case 1.

The pin holder 13 for preventing the fixing pin from being detached from the housing is formed in a predetermined shape to have a rubber-like elasticity, and is provided inside the tubular pin-holder housing section 35 formed on the outer surface of the cover 2.

The fixing pin 14 is composed of a grasping section 14a having a coil-spring shape and a penetration section 14b which passes through the pin insertion holes 28, 36, 55, and 59 respectively formed in the case 1, the cover 2, the code wheel 4, and the slider rotating plate 5 to fix the position of the rotating direction of the code wheel 4 with respect to the signal detecting elements 11 and the position of the rotating direction of the slider 7 with respect to the resistance board 3 to a position where the absolute angle is 0°. The fixing pin 14 is mounted on the rotation angle detecting device until the rotation angle detecting device is incorporated into, for example, a car. After the rotation angle detecting device is incorporated into a car, the fixing pin is removed.

The rotation angle detecting device of the present embodiment is mounted on a rotating body, such as a steering shaft, in a state where the position of the rotation angle detecting device where an absolute angle is 0° exactly coincides with the neutral position of the rotating body. Then, if the rotating body rotates, the code wheel 4 connected to the rotating body rotates together with the rotating body, so that the amount of rotation within one rotation and the rotation direction are detected by the signal detecting elements 11. In addition, the rotation of the code wheel 4 is transmitted at a predetermined speed reduction ratio to the slider rotating plate 5 through the gear 6, and the relative position of the slider 7 with respect to the resistance board 3 changes. Therefore, an output voltage value of an absolute-type rotation detecting device constituted by the resistance board 3 and the slider 7 changes, so that the rotations more than one rotation of the rotating body are detected from the output voltage. Accordingly, the amount of rotation and the rotation direction of the rotating body within the finite number of rotations more than one rotation can be exactly detected.

When the rotation angle detecting device of the present embodiment is assembled, the centers of the circular pin insertion holes 28, 36, and 55 coincide with each other so that the code wheel 4 can be fixed at the position where the absolute angle is 0°. Then, the case 1, the cover 2, and the code wheel 4 are incorporated. In addition, the slider rotating plate 5 is incorporated into the cover 2 so that the centers of the circular pin insertion holes 28, 36, and 55 coincide with the center of the arc-shaped pin insertion hole 59 formed in the slider rotating plate 5. The set position of the slider 7 with respect to the slider rotating plate 5 and the resistance pattern formed on the resistance board 3 is designed so that a predetermined voltage value is output in such a state. However, there is a case where an output voltage value of an absolute-type rotation detecting section is measured before the case 1 and the cover 2 of the rotation angle detecting device are incorporated with each other and the output voltage value deviates from a predetermined value corresponding to the absolute angle of 0° because of manufacturing errors or assembling errors of the respective components. In this case, by rotating the code wheel 4 and by rotating the slider rotating plate 5 through the gear 6, the output voltage value of the absolute-type rotation detecting section can be equal to a predetermined value. In a state where the output voltage of the absolute-type rotation detecting section is adjusted to the predetermined value, the case 1 and the cover 2 are snap-connected to each other, and the penetration section 14b of the fixing pin 14 passes through the respective pin insertion holes 28, 36, 55, and 59, so that the code wheel 4 is directly fixed to the case 1 and the cover 2. In addition, the slider rotating plate 5 and the gear 6 are fixed to the case 1 and the cover 2 through the code wheel 4 and the gear 6. In such a manner, the rotation angle detecting device is assembled in which the respective rotating sections are adjusted to the position where the absolute angle is 0°.

In the slider rotating plate 5, the pin insertion hole 59 having a long-circular-arc shape is formed in the circumferential direction thereof. Therefore, by rotating the slider rotating plate 5 in the longitudinal range thereof when it is assembled, the output voltage value of the absolute-type rotation detecting section is adjusted to a predetermined value, and then the fixing pin 14 can be inserted. Accordingly, after assembled, the rotation angle detecting device of the present embodiment can adjust an output voltage value thereof without a special output-voltage adjusting unit, so that a rotation angle detecting device having a good quality can be manufactured at low costs and high yield.

In the rotation angle detecting device of the present embodiment, since an incremental-type rotation detecting section is constituted by the photo-interrupter 11 and the code wheel 4 having the signal detection through-holes 53a therein, signal detection can be performed in a non-contact state. Further, signal-detection precision is not degraded due to the degradation of the code wheel unlike the case where a code pattern string is formed on a reflecting plate. Therefore, signal detection can be performed precisely and reliably.

In the rotation angle detecting device of the present embodiment, the resistance board 3 and the circuit board 9 are electrically connected to each other through the connection terminal 45 provided on the resistance board 3. Therefore, when the rotation angle detecting device is assembled, the connection between the resistance board 3 and the circuit board 9 can be completed only by plugging the leading end of the connection terminal 45 into the circuit board 9, so that the rotation angle detecting device can be assembled easily.

As described above, in the rotation angle detecting device according to the invention, the circular pin insertion hole is formed in the position where the case and the cover face each other, and the pin insertion hole having a long-circular-arc shape in the circumferential direction of the slider rotating plate is formed in the position where the slide rotating plate and the circular pin insertion hole face each other. Therefore, fine adjustment of an output voltage value of the absolute-type rotation detecting section can be performed when the rotation angle detecting device is assembled, so that a rotation angle detecting device having a good quality can be easily obtained at low costs and a high yield.

The invention claimed is:

1. A rotation angle detecting device comprising:
   a housing that is formed by snap-connecting a cover to a case having an opening for allowing a rotating body to be rotatably supported;
   a resistance board that is fixed on an inner surface of the cover to have an opening into which the rotating body inserted;
   a slider rotating plate that has an opening into which the rotating body is inserted, that is disposed to be opposite to the resistance board, and that is rotatably supported by the cover;
   a first gear that is formed in the slider rotating plate;
   a slider that is fixed on the slider rotating plate and is slidably brought into contact with the resistance board;
   a code wheel that has a code pattern string thereon, that rotatably holds the slider rotating plate, and that is rotatably held in the cover and the case;
   a second gear formed in the code wheel;
   a circuit board that is fixed to the case;
   a plurality of signal detecting elements that are electrically connected to the circuit board to detect signals from the code pattern string; and
   a gear that is supported by the case, that has a third gear which is meshed with a first gear formed in the slider rotating plate and a fourth gear which is meshed with the second gear formed in the code wheel, and that decelerates the rotation of the code wheel to transmit the rotation to the slider rotating plate,
   wherein circular pin insertion holes through which a fixing pin passes so as to fix the code wheel in a position where an absolute angle is 0° are respectively formed in positions where the code wheel, the case, and the cover face each other, and
   in a position where the slider rotating plate and the pin insertion hole face each other, a pin insertion hole having a long-circular-arc shape in a circumferential direction of the slider rotating plate is formed to enable the slider rotating plate to be rotated within a predetermined angle range in a state where the fixing pin is inserted.

2. The rotation angle detecting device according to claim 1,
   wherein, as the code pattern string, a slit string is formed in the code wheel, and
   a photo-interrupter formed by a combination of a light-emitting element and a light-receiving element is used as the signal detecting element.

3. The rotation angle detecting device according to claim 1,
   wherein the resistance board is provided with connection terminals that electrically connect the resistance board to the circuit board, and
   the circuit board is provided with connector pins that electrically connects the circuit board to an external connector.

* * * * *